Dec. 1, 1942.   V. J. F. DONNELLY ET AL   2,303,621
APPARATUS FOR WEIGHING, TENSILE TESTING OR FOR OTHER LIKE PURPOSES
Filed March 29, 1940   4 Sheets-Sheet 1
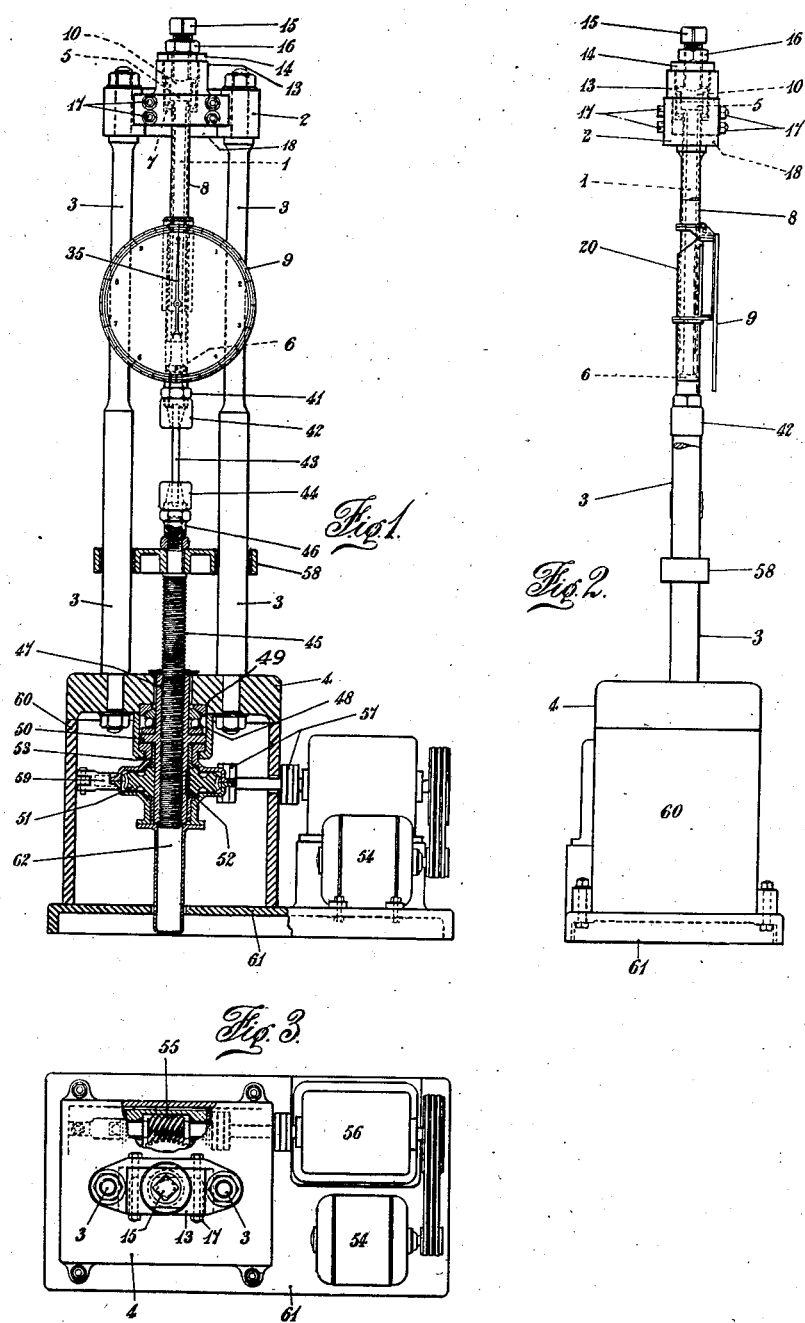
INVENTORS
Victor J. F. Donnelly
John E. H. Morgan
BY
ATTORNEY

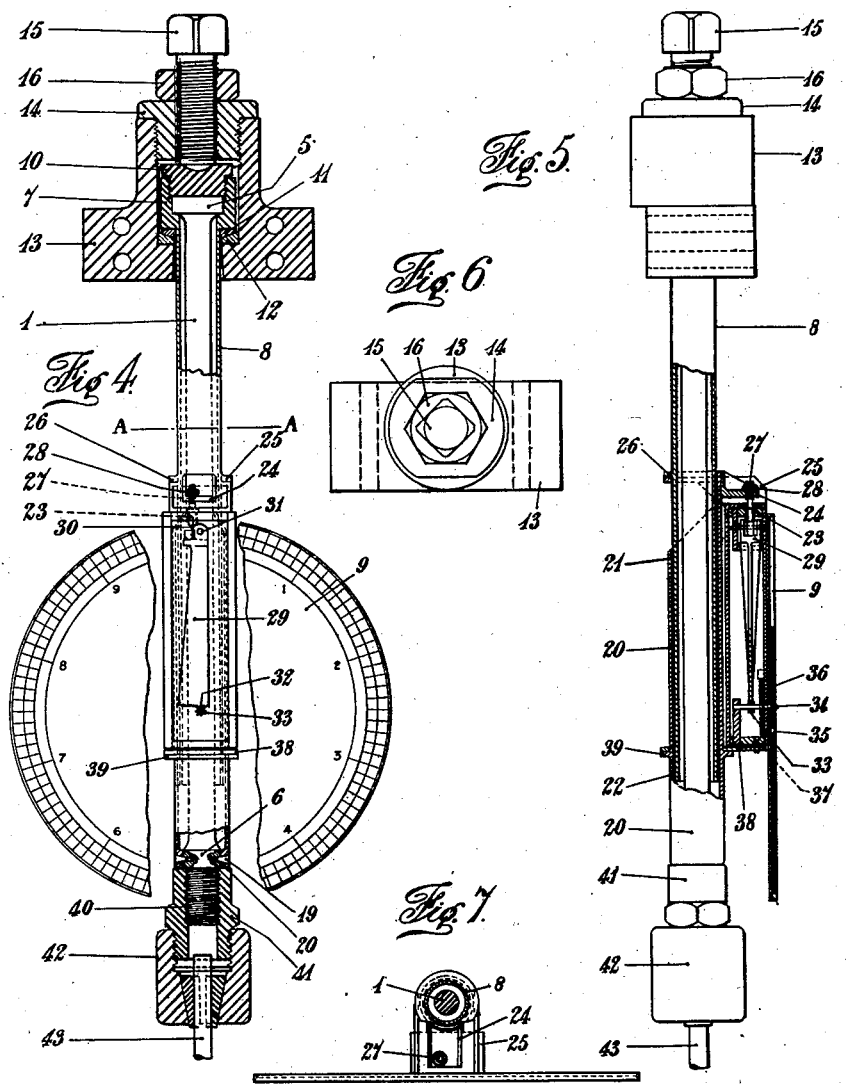

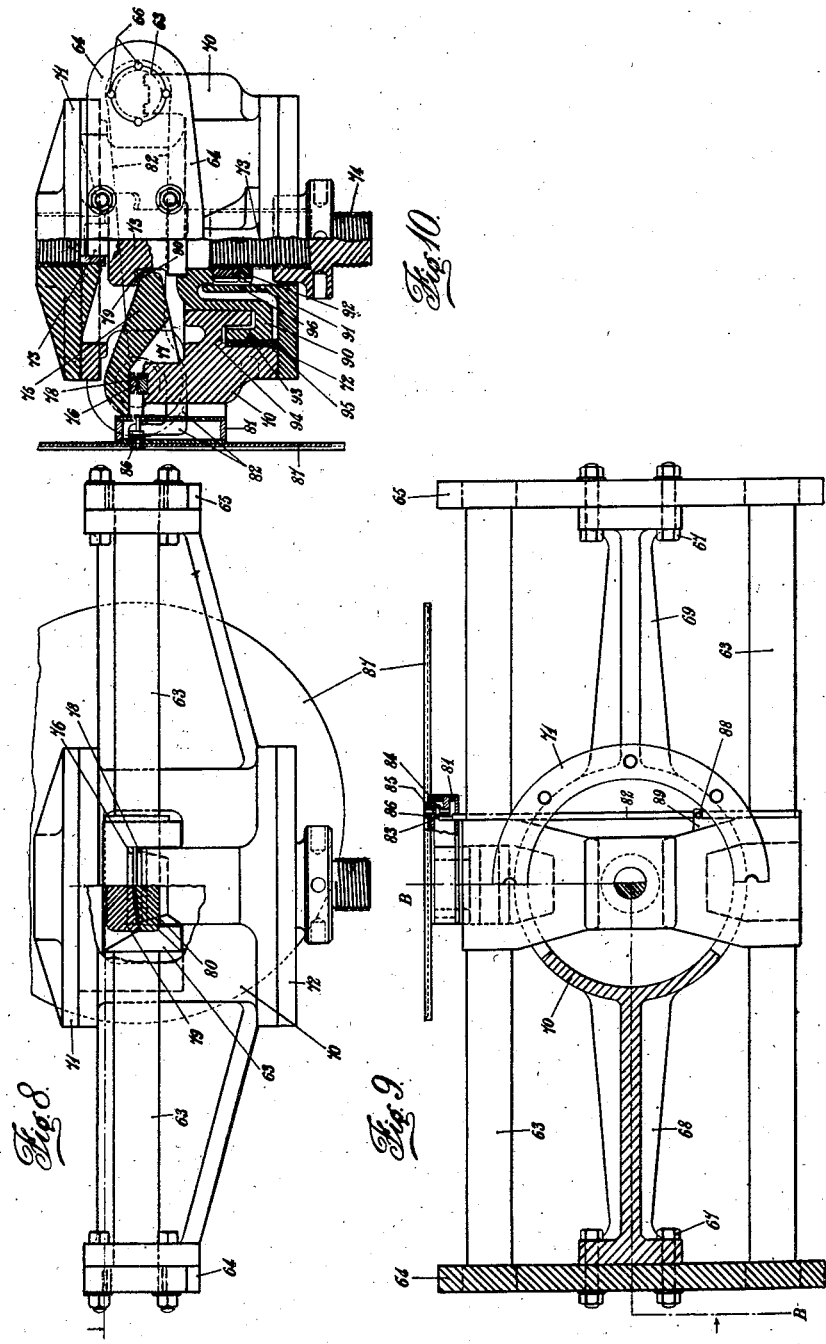

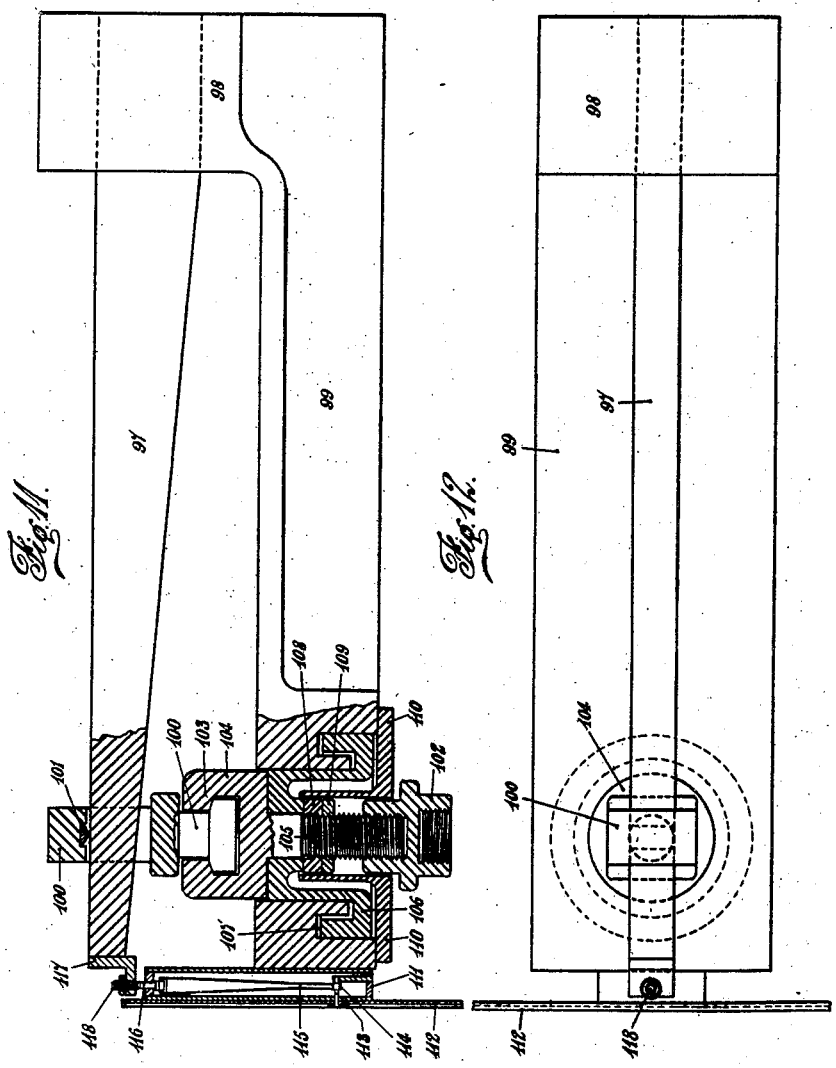

Patented Dec. 1, 1942

2,303,621

UNITED STATES PATENT OFFICE 2,303,621

APPARATUS FOR WEIGHING, TENSILE TESTING, OR FOR OTHER LIKE PURPOSES

Victor John Forsythe Donnelly and John Edward Harris Morgan, Hatch End, England

Application March 29, 1940, Serial No. 326,730
In Great Britain January 18, 1939

7 Claims. (Cl. 265—12)

This invention relates to improvements in apparatus for weighing, tensile testing or for other like purposes.

The object of this invention is to provide means whereby accurate measurements may be made in connection with weighing articles, determining forces or testing the tensile or other strength of materials, the means being of such a nature as to give with simple construction reliable and accurate results.

According to this invention use is made of the fact that materials increase or decrease in length or deflect or twist or bend when a force is suitably applied to them. By measuring the amount of movement or deformation caused by such force the amount of force producing the deformation or stress can be determined. These principles are according to the present invention applied in the construction of a weighing machine or in connection with a tensile or other testing machine. In such cases a force may be applied in such a way as to extend a rod of steel or other suitable material and the extension of the rod being measured by suitable means such as an engineer's dial measuring gauge or a suitable optical measuring system or other suitable means. The apparatus is calibrated by a known load or loads applied to the rod and its extension is determined by the measuring device used. As is well known the extension of, for instance, a rod or the like is directly proportional to the load imposed within the elastic limit of the material forming the rod and from these facts it is possible to determine unknown loads.

The improved apparatus for weighing, determining forces tensile testing or other like purposes comprises a rod or the like of steel or other suitable material, a gauge or measuring device having calibrations or graduations indicating the amount of force applied according to the amount of deformation of the rod or the like within its elastic limit according to applied forces and means for the connection of a load or force to be determined, or test piece or the like whereby the magnitude of the force, the weight of the load, or the pull on the test piece can be indicated.

The measuring device may be calibrated in suitable units of weight such as pounds, tons, kilograms or other units of measurement.

The rod or the like may be deformed by an increase or decrease of its length or by deflection or by torsion.

The invention will now be described with reference to the accompanying drawings in which:

Figure 1 is a sectional elevation of one form of a tensile testing machine constructed according to this invention;

Figure 2 is a sectional side view thereof;

Figure 3 is a sectional plan;

Figure 4 is a sectional elevation showing the rod and dial mechanism which forms a complete indicating unit, drawn to a larger scale.

Figure 5 is a sectional side view thereof;

Figure 6 is a plan;

Figure 7 is a sectional plan taken on the line A—A of Figure 4;

Figure 8 is a sectional elevation of a modified form of testing machine employing torsional deflection;

Figure 9 is a half sectional plan thereof;

Figure 10 is a cross sectional elevation taken on the line B—B of Figure 9;

Figure 11 is a sectional elevation of a further modified form employing bending deflection, and Figure 12 is a plan thereof.

Referring more particularly to Figures 1 to 7 which show the invention in connection with a tensile testing machine a rod or bar 1 of heat treated spring steel is suspended from a bridge piece 2 which is supported on two columns 3 secured at the lower ends to a straining plate 4. The bar 1 which is of uniform diameter for a considerable portion of its length has its ends enlarged to form head 5 and a foot 6. The head 5 is positioned in an enlarged end or socket-like extension 7 of a tube 8 which is adapted to carry an indicating or dial gauge 9 at its lower end in the manner to be hereinafter described. The head 5 is securely held in the socket 7 of the tube 8 by a plug 10 screwed into the said socket 7. This socket end 7 of the tube 8 is supported on part spherical shaped seating collars 11 and 12 provided in a housing 13 and is retained in position by a nut 14 screwed into the said housing 13 and a bolt 15 screwed into the said nut 14 and engaging at its inner end the said plug 10, a suitable lock nut 16 being provided on the said bolt 15. The housing 13 carrying the bar 1 and the tube 8 is slidably mounted in the bridge piece 2 and adapted to be secured therein by bolts or the like 17. A suitable slot 18 is provided in bridge piece 2 to permit of the slidable mounting of the housing 13. Thus this portion of the apparatus shown more particularly in Figures 4 to 7 can be readily removed for the purpose to be hereinafter described. To the lower end or foot 6 of the rod or bar member 1 is secured such as by screws 19 a further tube 20 which is adapted to telescope over the tube 8 connected with the upper end of the bar 1. This outer tube 20 which is made a slide fit on the tube 8 by the two brass rings 21 and 22 is adapted to extend to a point just above the actuating pin 23 of the dial gauge 9 and is fitted with an arm 24 which extends outwardly over the said pin 23. The upper end of the tube 20 carrying the arm 24 extends through a slot in a bracket 25 which carries the dial gauge 9 and this bracket 25 is secured to the tube 8 through the medium of a flange 26 secured or formed on the said tube 8. The arm 24 is provided with a screw 27 having a knurled locking nut 28 for adjustment purposes. The lower end of screw 27 is provided with a hardened and ground tip which presses down on to the dial gauge pin 23 when the rod 1 is extended so as to register on the indicator dial the force applied. The dial gauge pin or plunger 23 is conveniently connected at its lower end to a quadrant 29 by a flexible leaf spring 30. This quadrant 29 which has a fulcrum 31 is formed with gear teeth 32 to co-operate with a pinion 33 on a spindle 34 carrying the pointer 35 which is adapted to move over the calibrated dial of the dial gauge 9. A spiral hair spring 36 is connected with this spindle 34 to return the pointer 35 to zero position. The dial gauge or indicating unit is further held in position on the tube 8 by one or more pins 37 freely slidable in holes in the casing of the unit 9 and mounted in a plate 38 carried by the tube 20 through the medium of a flange 39 thereon. The lower end of the bar 1 is preferably screw threaded at 40 to receive an adaptor 41 for a suitable type of grip or shackle 42 whereby one end of a specimen or the like 43 may be held or gripped. The other end of the specimen 43 is secured in a similar grip 44 which is attached to a straining screw 45 by another adaptor 46. Any suitable hand or power means may be provided to strain the specimen. In the construction shown more particularly in Figures 1 to 3 the straining screw 45 is moved up or down by the rotation of a nut 47. The upward pressure of the nut 47 is taken by the straining plate 4 through the medium of an anti-friction thrust bearing 48 provided with a spherical seating 49, the nut 47 being formed with a flange or collar 50 to carry the said bearing 48. The spherical seating 49 working in conjunction with the spherical seatings 11 and 12 at the upper end of the tube 8 will allow the grips 42 and 44 to line up one with the other and so prevent any but direct tensile stress to occur in the specimen 43. On the nut 47 is secured a worm wheel 51 by, for instance, a key 52 and the complete assembly is held in position by a two part housing 53 which is secured by suitable flanges or the like to the straining plate 4. The arrangement is such that recoil is resisted on the fracture of the specimen 43. The worm wheel 51 is driven by a variable speed electric motor 54 through the medium of a worm 55 and a shaft and a two speed and reverse gear not shown in detail but contained in a gear box 56. Slight movement of the worm gear in relation to the gear box 56 is accommodated by two flexible or other suitable couplings 57 provided on the worm shaft. The rotation of the straining screw 45 and the worm gear housing is prevented by a yoke member 58 slidably mounted on the columns 3 and by a torque link 59 connected with a suitable casing 60 carrying the straining plate 4. The casing 60 is mounted on a base casting 61 which is also adapted to carry the electric motor 54 and the gear box 56. The worm housing is provided with an oil sump 62 to ensure adequate lubrication of the straining screw 45 and the nut 47.

In operation it will be understood that the dial is first calibrated by applying known loads to the rod or bar 1 and the screw 27 is adjusted to bring the indicator needle 35 of the dial gauge 9 to zero. When it is desired to use the apparatus for testing a specimen the said specimen 43 is inserted and gripped by the shackle 42. The motor 54 is then started and the reverse gear selected to move up the shackle 44 which is then tightened on to the other end of the specimen 43. The required forward speed is then selected and as the load comes on, through the medium of the worm gear 51 and 55 and straining screw 45, the necessary adjustments automatically take place at the spherical seatings and when all back lash and bedding down has taken place accurate readings on the dial gauge can be noted. This reading may be allowed to increase up to the limit to which the machine is made and if the rod or bar 1 is stressed to, for instance, one-sixth of its elastic limit at the medium load, on the total release of the load it will recoil and return to its original length. Obviously elongation of the rod or bar 1 will occur which is directly proportional to the force applied and the tube 20 secured to the lower end of the rod 1 will slide downwards over the tube 8. The indicating unit 9 will remain stationary as no movement takes place in the tube 8 but the screw 27 will depress the plunger 23 which is attached at its lower end to the quadrant 29 and cause it to pivot on its fulcrum 31 and rotate the pinion 33 and the needle or pointer 35 and so indicate on the dial 9 the elongation of the rod 1. Should the load be suddenly released, as for example, on the fracture of the specimen in a tensile test the rod member 1 would return to its original length with sufficient rapidity to damage the mechanism of the indicating unit if a solid connection were used between the tube 20 and the plunger 23 but it will be seen from the above description that the screw 27 will jump away from the plunger 23 so as to leave the pointer 35 to return freely to zero position by the influence of the spiral spring 36 or any other suitable type of return mechanism. It will be obvious that the apparatus may be used for weighing or for measuring forces or for other like purposes and if desired an eye bolt may be substituted for the screw 15 so that the indicating portion of the apparatus shown more particularly in Figures 4 and 5 could be suspended and the weight hung on the lower end of the rod 1 by any suitable attachment.

In a modified construction as shown in Figures 8 to 10 and when the torsion of a bar or rod is employed for measuring or indicating an applied force or for weighing, a pair of rods or bars 63 are preferably employed. The outer ends of these rods 63 are firmly secured in end plates 64 and 65 which are a force fit on the said ends. Additional security against turning is provided by pegs or dowels 66 driven in at suitable positions. These plates 64 and 65 are also bolted at 67 to projections 68 and 69 of a housing 70 fitted with top and bottom cap members 71 and 72 respectively which are adapted to provide supporting means for the unit. Within the housing 70 is disposed a square headed weigh bar 73 carrying at its lower end an adaptor 74 to which may be attached a shackle for testing or a weight in the manner and for the purposes previously described. The intermediate portion of each rod member 63 is formed with an arm or inwardly disposed extension 75 to co-operate with the head of the weigh bar 73 carrying the adaptor 74. Any suitable means may be employed for transmitting the movement of the weigh bar 73 to the two rods or bars 63 in a direction away from and at right angles to the common plane of the axes of the bars or rod member 63. Bending of the bars or rods 63 can be prevented by introducing one or more bearings of suitable type approximately midway between their ends but in the present case knife edges 76 are used and these knife edges 76 positioned in suitable cutaway portions 77 of the arm portions 75 of the bars 63 rest on supports 78 located in slots cut in extensions of the housing 70. The line of contact of the knife edges coincides exactly with the axis of the rods or bars 63 so allowing them to turn or pivot about their centres. The preferred method of transmitting movement of the weigh bar 73 to the two rods or bar members 63 consists in the two opposite faces 79 under the head being formed to mesh with formed ends 80 of the upper faces of the arms 75 of the bar members 63 in such a way that the leverage remains constant and the force transmitted to the bar members 63 remains parallel to the axis of the weigh bar 73 throughout its maximum allowed strain. The two contact faces of the arms 63 are arranged at angle to one another in a similar way to the tooth in a herringbone gear wheel. Generated convex radius instead of involute form is used for these faces, so making a line that is tangential to the crest of the radiused face at any point on the two faces. The line is also a radius of the circle represented by the rod member lever 63 pivoting about its knife edge 76. Two similar radiused faces are provided on the head of the weigh bar 73, the herringbone angle being made to coincide with that on the arms and being equivalent to a rack, the line representing the crest of the radius being straight. In this way bearing contact between the head of the weigh bar 73 and each arm 63 is at two points, one on each face. This point remains on the centre line of the two bar members 63 provided the stroke of the weigh bar 73 does not exceed the distance from the bottom of the contact slopes to their common apex. An indicating unit 81 is rigidly fixed to the housing 70 and is connected to one of the rod members 63 by a quadrant lever 82 formed with bevel gear teeth 83 adapted to gear with a bevel pinion 84 fixed on a suitable spindle 85 carrying the pointer 86 which is adapted to move over the dial 87 of the indicator unit 81. The quadrant lever 82 is free to rotate about the circular part of one of the rods or bars 63 but is adapted to be depressed by an adjustable screw 88 provided on an extension 89 of the arm 75 of one of the bar members 63. This arrangement will allow the quadrant lever 82 being returned to zero by a suitably arranged light spring (not shown) when the bars or rods 63 fly back to their original position due to the sudden release of the load. The recoil may be controlled by a dashpot. A convenient arrangement is shown more particularly in Figure 10. In this arrangement a piston 90 is secured to the weigh bar 73 by a nut 91 and a lock nut 92 screwed on to a threaded portion of the said weigh bar 73. This piston 90 is annularly flanged at 93 and adapted to project into an angular U shaped recess 94 formed in the housing 70 and the piston 90 is guided against rotation by forming therein a groove which is a slide fit on a key 95 secured in the housing 70. The bottom of the housing 70 is closed by the cap 72 which is formed with an inwardly projecting flange 96 so as to provide a cup for the reception of oil or other fluid contained in the dashpot.

In operation it will be seen that there is provided a complete unit for measuring or indicating any force applied to the attachment adaptor 74 in a direction away from and at right angles to the common plane of the axes of the bar members 63. The above described unit may be supported by either the top cap 71 or bottom cap 72 of the housing 70 or by an eye bolt screwed into the upper cap 71. When a force or load is applied it will be resisted by the stresses in the bars or rods 63 and will provide an angle of torsional deflection proportional to the load applied. It will be seen that the load or force applied will be indicated by the pointer 86 moving over the dial 87 of the indicator unit 81. The connections are such that recoil will be controlled by the dashpot previously described as the fluid will fill the recess 94 on the downward movement of the piston 90. The pointer 86 will be returned to zero position by its controlling spring as the quadrant lever 82 is not directly connected to the rods or bars 63 but only through an adjusting screw 88 which may be adjusted to move the pointer 86 to its zero position when so required. Alternatively a platform or the like could be provided on the top of the weigh bar so that a load could be indicated on the downward movement of the said weigh bar.

In a further modified construction as shown in Figures 11 and 12 and when the bending of a bar or rod is employed for measuring or indicating an applied force or for weighing, the bar or rod is in the form of a cantilever 97 which is secured at one end to the arm 98 of a bracket member or housing 99 of substantially L shape. Adjacent to the outer end of the cantilever 97 is mounted a stirrup member 100 fitted with a knife edge 101 engaging the said cantilever and carrying an adaptor 102 through the medium of a spherical connection 103. Conveniently the stirrup member 100 is connected to the adaptor 102 through the medium of a weigh bar 104 slidably mounted in the bracket member 99 forming a housing for the unit, the weigh bar 104 being formed with a threaded extension 105 for the connection of the adaptor 102 and with spherical shaped surfaces co-operating with similar shaped surfaces on the end of the stirrup member 100 to provide the spherical connection 103. The weigh bar 104 is fitted with a piston 106 shaped to form in conjunction with a recess 107 in the housing or bracket 99 a dashpot as in the previous construction, the piston 106 being secured on the weigh bar 104 by a nut 108 and a lock nut 109 on the threaded extension 105. The lower side of the dashpot is closed by an annularly flanged cover 110 secured on the housing or bracket 99. To the bracket 99 is also secured an indicating unit 111 having a dial 112 and a pointer mounted on a spindle 113 adapted to be operated through the medium of a pinion 114 and toothed quadrant 115 upon the downward movement of an actuating pin 116 slidably mounted in the dial casing 111 as in the first described construction. The outer end of the cantilever 97 is fitted with a bracket 117 carrying an adjusting screw 118 which is adapted to co-operate with the actuating pin 116 in the manner hereinbefore described.

In operation the unit is supported by its housing 99 in any convenient manner and when a load or force is applied as in the previous constructions through the medium of the adaptor 102 such load or force will be indicated by the pointer moving over the dial 112 of the indicator unit 111. The recoil will be controlled by the dashpot in the manner previously described and the pointer will be returned to zero position by a controlling spring as the indicating unit is not directly attached to the adjusting screw 118 on the cantilever arm 97.

It will be understood that the yield point and ultimate strength of the specimens are determined in the usual way, the dial gauge giving the loads at which these points occur. Elongation and reduction of area of the specimen are determined by the conventional methods. Any of the constructions above described may be used for tensile testing or for weighing purposes and any means may be provided to suspend the units or to connect the specimens or loads to be weighed.

It will be seen that by this invention apparatus is provided in which the increase or decrease in length or deflection or twist of a rod member or the like is employed to measure the weight of an article or to measure the force applied.

What we claim is:

1. Means for determining forces including a rod to be subjected to a predetermined deformation under a given force, means for creating said force in relation to the rod, the force-creating means acting through a piece to be tested, and an indicating device having an appropriately calibrated dial to measure loads within the elastic limit of the rod, said indicating device including a pointer for indicating function on the dial, and actuating means connected to the pointer and to the rod, said actuating means moving away from the indicating device under release of said force, and independent controlling means to cause the pointer to return to normal position when the pointer actuating means moves away from the indicating device, whereby to avoid damage to the indicating means.

2. A construction as defined in claim 1, wherein the force creating means is operated to extend the length of the rod in such predetermined deformation.

3. A construction as defined in claim 1, wherein the force-creating means is operated to torsionally deflect the rod in such predetermined deformation.

4. A construction as defined in claim 1, wherein the force-creating means is operated to bend the rod in such predetermined deformation.

5. A construction as defined in claim 1, wherein a housing is provided in which a portion of the rod is fixed, and wherein means are provided to connect another portion of the rod for movement in relation to such fixed portion.

6. A construction as defined in claim 1, wherein a housing is provided in which one end of the rod is secured and wherein a first tube is provided in which a portion of the rod extends, and wherein a second tube is connected to the other end of the rod and movable in relation to the first tube, the dial being connected with one tube and the pointer actuating means connected with the other tube.

7. A construction as defined in claim 1, wherein the indicating device includes a spindle carrying the pointer and a pinion, a quadrant co-operating with the pinion and a slidably mounted pin connected with the quadrant and engaged by the pointer actuating means through an adjustably mounted member.

VICTOR JOHN FORSYTHE DONNELLY.
JOHN EDWARD HARRIS MORGAN.